United States Patent [19]
Hankel

[11] 3,977,492
[45] Aug. 31, 1976

[54] ACOUSTICAL MATERIAL FOR USE IN ASSOCIATION WITH NOISE GENERATING MACHINERY

[75] Inventor: Keith M. Hankel, Dayton, Ohio
[73] Assignee: Acon, Inc., Dayton, Ohio
[22] Filed: Jan. 9, 1975
[21] Appl. No.: 539,854

[52] U.S. Cl. ............................................. 181/33 G
[51] Int. Cl.² .................... E04B 1/99; G10K 11/04
[58] Field of Search ................................. 181/33 G

[56] References Cited
UNITED STATES PATENTS

| | | | |
|---|---|---|---|
| 3,103,987 | 9/1963 | Gildard et al. | 181/33 G UX |
| 3,166,149 | 1/1965 | Hulse et al. | 181/33 G UX |
| 3,255,843 | 6/1966 | MacDonald | 181/33 G UX |
| 3,502,171 | 3/1970 | Cowan | 181/42 X |
| 3,630,312 | 12/1971 | Woodward et al. | 181/42 X |
| 3,700,067 | 10/1972 | Dobbs et al. | 181/33 G |
| 3,734,234 | 5/1973 | Wirt | 181/33 G |
| 3,770,560 | 11/1973 | Elder et al. | 181/33 G X |

*Primary Examiner*—John Gonzales
*Attorney, Agent, or Firm*—Biebel, French & Nauman

[57] ABSTRACT

An improved acoustical material, which is simple in construction and uses conventional, inexpensive materials, for use as a lining material in association with noise generating machinery, comprising, in combination, a composite layer of plural layers of porous material which will not deteriorate, swell or retain oil, solvents, or water such as are found in machinery, and which has acoustical flow resistance of between 20 rayls and 80 rayls, and a highly porous layer which is or acts as a dead air space relative to the composite.

4 Claims, 5 Drawing Figures

U.S. Patent    Aug. 31, 1976    3,977,492
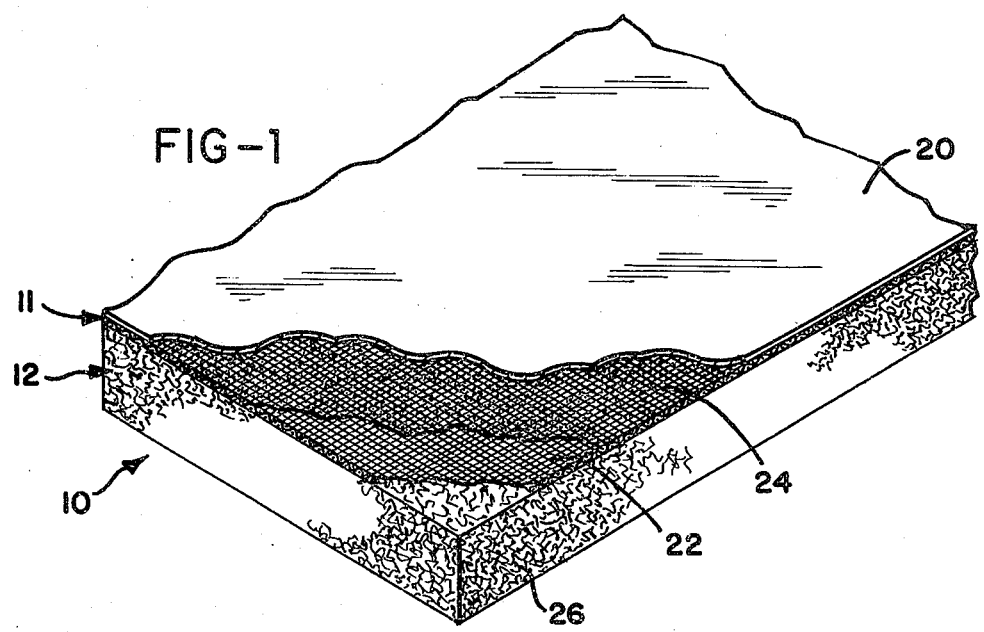
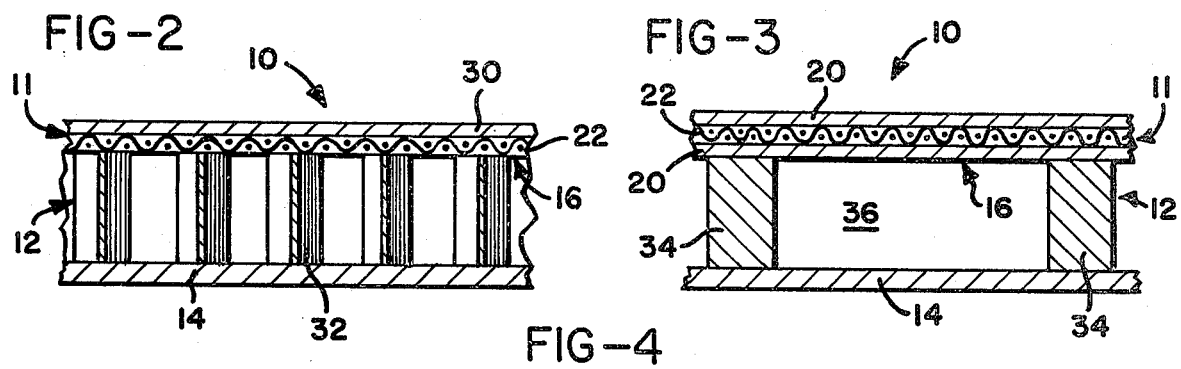
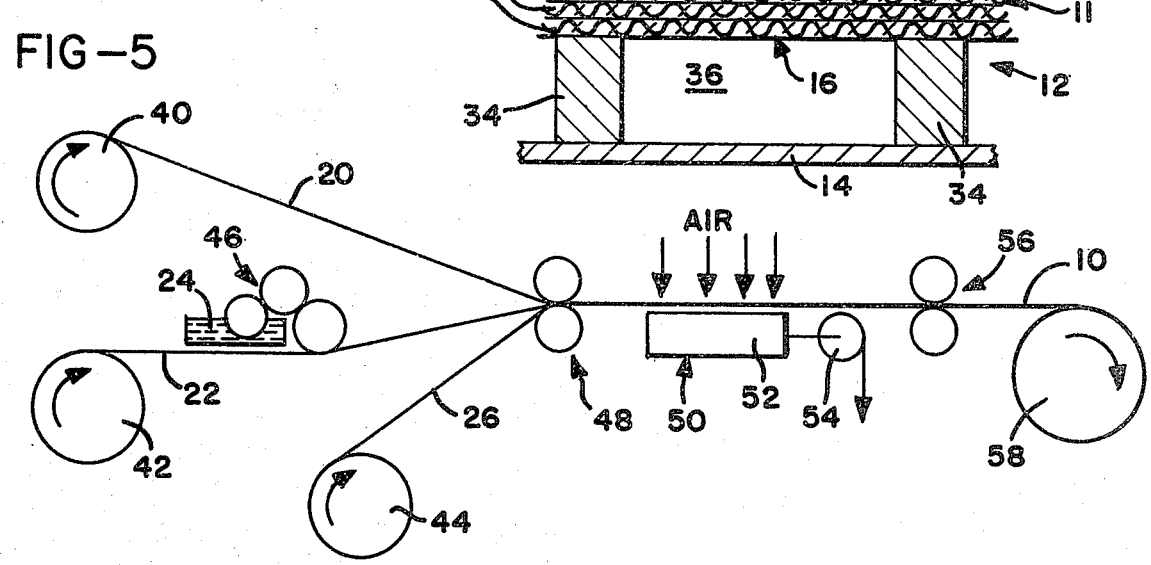

ACOUSTICAL MATERIAL FOR USE IN ASSOCIATION WITH NOISE GENERATING MACHINERY

BACKGROUND OF THE INVENTION

The invention relates generally to sound absorbent materials, and specifically to sound absorbent materials for industrial applications, such as linings on or inside enclosures around machinery.

Recently, increased attention has been focused on noise pollution, including that generated by the use of machinery, such as drills, lathes, and the like. Noise is a problem to the operator of the machine, as well as to those in the area where the machine is being operated. As a result efforts have and are being made to prevent or to reduce the noise level of machinery in order to provide a safer, quieter work area.

Attempts have been made to silence or to reduce machine noise by lining the inside of the machine, or housing surrounding the machine, with a material which will soak up or reduce the noise. It is important that the sound absorbent material be relatively inexpensive, in addition to being an efficient and effective sound absorber. If the material is too expensive, the expense will make its use prohibitive, even though it is efficient and effective, especially considering the number of machines which would use the material. Thus, an inexpensive material would find greater use, even where it was inefficient or would eventually become ineffective and have to be replaced, because of its low cost.

A typical lining material for machinery is open-cell polyurethane foam, which is a resistive sound absorber. It is a relatively inexpensive material, and it will reduce the noise level by providing a resistance to the passage of the sound emanating from the machine. But, open-cell polyurethane foam has a tendency to soak up oil and the like used to lubricate the machine. Once the cells of the sound-absorbent foam material fills with oil, the material becomes noise reflective, and so is inefficient and ineffective. Further, the accumulated oil represents a fire hazard. Another sound absorbent material is the non-woven fiberglass pad which is similar to open-cell foam in its operation, and likewise becomes ineffective and/or hazardous due to oil absorption.

Other sound absorbing materials and structures are known in the art, but these materials are too sophisticated, too complicated, and/or too expensive. Often the construction materials are expensive, ineffective, inefficient or hazardous, such as with paper, wood, or asphalt materials. Such structures are not necessarily inoperative, as they are useful for general acoustical applications, but they are not useful in association with noise generating machinery.

Therefore, a need exists for an improved sound absorbent material for industrial applications, such as lining on the inside of machines or the enclosures around the machines.

SUMMARY OF THE INVENTION

The improved acoustical material of the invention broadly comprises two elements: a first layer which is an acoustical flow resistance composite, and a second highly porous layer which is or acts like a dead air space.

The acoustical flow resistance composite comprises plural layers which in combination have an acoustical flow resistance of between 20 and 80 rayls and which are relatively inexpensive, conventional materials. In one embodiment the composite comprises a layer of woven fiberglass screen or cloth adhesively bonded to a medium, such as an open, woven, metal screen, which provides a support or structural integrity for the composite. In another embodiment, a layer of polyvinyl chloride is adhesively bonded to the medium. In yet another embodiment, layers of woven fiberglass cloth are adhesively bonded to either side of the medium. In still another embodiment, three layers of woven fiberglass cloth are joined together.

The highly porous layer which acts like or is a dead air space can comprise a layer of material which provides a relatively large open space next to the acoustical flow resistance composite. A non-woven animal, mineral, or vegetable fiber mat having a binder therein and a thickness on the order of 10 or more times the thickness of the composite is one example of a suitable material which acts as a dead air space. It is quite porous and offers essentially no acoustical flow resistance, especially compared to the composite layer. Further, it is a relatively inexpensive material and is relatively inert to most conventional lubricant materials encountered in machinery. Alternatively, the dead air space can be that created by using spacers so that the acoustical flow resistance composite is spaced from the solid surface to which it is applied and an actual dead air space is created.

The acoustical flow resistance composite and the highly porous layer can be combined in any conventional manner, such as by using mechanical fasteners, adhesives and the like. It will have a thickness of between one inch and two inches. Its length and width will depend upon its use and the size of the object to which it is applied.

Its simplicity of construction, which uses conventional, inexpensive materials, provides an inexpensive sound absorbent material. The arrangement of the layers provides an effective sound absorbent material which will not be rendered ineffective or become an unsafe fire hazard. It will not deteriorate, swell, or retain solvents, oil or water from the machine on which it is being used. Further, the acoustical material results in absorption coefficients which excel those generally obtained by the more common resistive sound absorbers, such as open-cell foam, of equal thickness.

It is therefore an object of this invention to provide an improved sound absorbent material which is safe, effective, and inexpensive and is especially useful for lining the inside of or enclosures around machinery.

Other objects and advantages of the invention will be apparent from the following description, the accompanying drawings and the appended claims.

BRIEF DESCRIPTION OF THE DRAWINGS

FIG. 1 is a perspective view, partially broken away, of one embodiment an improved acoustical composite in accordance with the teachings of the invention;

FIGS. 2–4 are cross-sectional views of further embodiments of acoustical composites in accordance with the teachings of the invention; and FIG. 5 is a schematic view of a process for forming an improved acoustical composite in accordance with the teachings of the invention.

DESCRIPTION OF THE PREFERRED EMBODIMENT

The acoustical material of the invention shown generally at 10 in FIG. 1 comprises an acoustical flow resistance composite layer 11 and a relatively highly porous layer 12 which is or acts like a dead air space. The composite 11 comprises plural layers of inexpensive, conventional materials which are chemically inert to the materials in the environment of a machine, such as oil and the like, and which composite has an acoustical flow resistance of between 20 and 80 rayls. The porous layer 12 offers essentially no acoustical flow resistance, especially compared with composite 11, and so acts as dead air space.

The composite acoustical material 10 is used to line, for example, the inside of the housing surrounding a machine motor (not shown) in a conventional manner with the composite layer 11 towards the source of the noise, such as the motor. As shown in the embodiments in FIGS. 2–4, porous layer 12 of material 10 is applied against a wall 14, which could be a machine housing wall, so that the composite layer 11 is exposed.

The acoustical material 10 is a reactive sound absorber, which acts as a broad frequency band resonator, as compared with open-cell foams which are merely resistive absorbers of sound. Any contaminants from the motor, such as oil, solvents, water and the like, which may splash on the composite 11, will not accumulate, as is the case with the foams, but will pass or seep through the composite layer 11 to inner surface 16 and drain away from the material 10.

In the embodiment shown in FIG. 1, composite 11 comprises a woven fiberglass screen or cloth layer 20 bonded to a medium 22, which is an open mesh wire screen or the like and which provides structural integrity for fiberglass layer 20 and the composite 11. Fiberglass layer 20 and medium 22 are joined by adhesive layer 24. The composite layer 11 will have an acoustical flow resistance of between 20 and 80 rayls, and preferably between 30 and 50 rayls.

Further as shown in FIG. 1, adhesive layer 24 penetrates medium 22 to bond composite layer 11 to porous layer 12, which is a non-woven fiber mat 26 and which acts as a dead air space. The acoustical material 10 will preferably be between about 1 and 2 inches thick, since that range of thickness results in absorption coefficients which excel those generally obtained with the common resistive sound absorbers. But, thicknesses which are slight variations from the preferred range can be used since the rayl value in combination with the porous layer thickness, i.e., the dead air space thickness, determine the amount of sound absorption at a particular frequency (hertz). Its length and width will vary with the dimensions of the surface to be covered, and it will usually be available in rolls of indefinite length and in widths of between 2 feet and 4 feet.

The woven fiberglass screen or cloth 20 comprises any conventional, commercially available fiberglass cloth having a thickness of between about 0.001 inch and 0.010 inch and a weight of between about one and five ounces per square yard, and an acoustical flow resistance of between about 10 rayls and 20 rayls. There is no criticality in the woven pattern, yarn size or twist, or finish. The finish will depend to some extent on the end use of the fabric, as the finish is primarily for the purpose of aiding the bond of the fabric to other materials, improving the lubricity and high temperature abrasion resistance of the fabric and stabilizing the weave. Examples of woven fiberglass fabrics suitable for use in the acoustical materials of the invention are the following, which are made by Burlington Glass Fabrics Company, a division of Burlington Industries:

| STYLE | FINISH | PIECE NUMBER |
| --- | --- | --- |
| 392/56 | AM 42 | 247024 |
| 392/52 | AM 44 | 247027 |
| 392/56 | AM 43 | 247032 |
| 392/56 | AM 42 | 247025 |
| 392/52 | AM 44 | 247030 |

As an alternative to the fiberglass fabric or cloth, polyvinyl chloride cloth having an acoustical flow resistance of between about 20 rayls and 80 rayls can be employed.

The medium 22 adds structural integrity to the composite layer 11, and can be any conventional, commercially available open mesh woven steel, aluminum, fiberglass and the like screening. Examples of screens useful in the composite layer 11, but not limited thereto, are the following: 28 × 28 mesh × 0.010 gauge; 18 × 16 mesh × 0.028 gauge; and 18 × 8 mesh × 0.032 gauge.

The non-woven fibrous mat 26 is an open, highly porous layer which offers essentially no acoustical flow resistance, especially compared to the composite layer 11. Normally, it will determine the overall thickness of the acoustical material, since it comprises the predominant amount of the total thickness. Mat 26 will be on the order of ten times or more thicker than the composite layer. One suitable material for mat 26 is non-woven hogs hair fiber mat having a latex or neoprene binder, such as Paratex, a rubberized curled hair sheet sold by Blocksom & Company, Michigan City, Ind. Other conventional, commercially available highly porous materials are acceptable as long as they act like or create a dead air space.

FIGS. 2–4 show other embodiments of the acoustical material of the invention. In the embodiment of FIG. 2, the composite 11 is comprised of a porous polyvinyl chloride (PVC) fabric sheet 30 joined to medium 22, by a suitable adhesive or by the inherent adhesiveness of the PVC sheet. Also, the porous layer 12 comprises an open honeycomb layer 32, which is conventional in the art.

In FIG. 3, composite 11 is comprised of two layers of fiberglass cloth 20 adhesively bonded to either side of medium 22. The composite 11 is in turn joined to supports or spacers 34 which physically establish a dead air space 36 between the composite 11 and an enclosure wall 14. Thus, porous layer 12 in FIG. 3 comprises spacers 34 and dead air space 36. Spacers 34 are light weight and inert, and can comprise metal or plastic.

Acoustical material 10 in FIG. 4 is similar to that shown in FIG. 3 except that composite 11 is comprised of three layers of fiberglass 22, which are physically joined to spacers 34 by staples or the like.

The acoustical material of the invention is safe, effective, and inexpensive, particularly as a material for lining and reducing the noise in machinery. The materials are commercially available, and will not deteriorate, swell, or retain oil, solvents or water. Further, they can be steam cleaned if desirable.

The acoustical material 10 of FIG. 1 may be made by the process of FIG. 5 whereby fiberglass fabric 20 is fed from a roll 40 thereof, wire screen 22 is fed from a roll 42, thereof, and fiber mat 26 is fed from a roll 44 thereof, and they, along with adhesive material 24, are joined together. The adhesive applicator 46 applies adhesive material 24 to screen 22 before bringing the layers into contacting relationship between laminating rolls 48. The adhesive, such as adhesive No. 847 sold by 3M company, is applied in an amount of about 5 gallons per hundred square feet of material. Alternatively, the adhesive can be applied by spraying, brushing, or dipping.

After the layers are joined, they are passed over a drying section 50 which comprises a vacuum box 52 evacuated by a conventional air pump 54. When the layers are brought together by laminating rollers 48, the adhesive 24 will flow into contact with and bond all of the layers. By drawing air through the acoustical material, the adhesive is set and the acoustical flow resistance of the composite is adjusted to the desired valve, usually between 20 and 80 rayls. Tensioning and driving rollers 56, which are conventional in the art, are used to pull material 10 past drier 50 and keep the layers in contact until the adhesive is set. Acoustical material 10 can then be accumulated in roll form such as roll 58, or subject to further processing, such as cutting to size, packaging, and the like.

The acoustical material of the invention need not be made by the process shown in FIG. 5, and so alternative processes can be used. Further, although joining the material 10 using an adhesive is preferred, other attachment means such as clipping, pinning, stapling, sewing and the like, can be employed.

While the processes and products herein described constitute preferred embodiments of the invention, it is to be understood that the invention is not limited to these precise processes and products, and that changes may be made therein without departing from the scope of the invention.

What is claimed is:

1. An acoustical material for use as a lining material in association with noise generating machinery consisting of:
   a. a composite layer of plural layers of porous material which will not deteriorate, swell, or retain oil, solvents or water such as are found in machinery, and which has an acoustical flow resistance of between 20 rayls and 80 rayls, said composite comprising at least one layer of woven fiberglass cloth, having an acoustical flow resistance of between 10 rayls and 20 rayls adhesively bonded to an open mesh wire screen which provides structural integrity for said composite layer, and
   b. a highly porous layer which is or acts as a dead air space relative to said composite, said highly porous layer being a non-woven fibrous mat having a binder therein.

2. An acoustical material as in claim 1 wherein there are two layers of said fiberglass cloth.

3. An acoustical material as in claim 1 wherein said composite has an acoustical flow resistance of between 30 and 50 rayls.

4. An acoustical material as in claim 1 wherein the acoustical material has a thickness of between 1 inch and 2 inches.

* * * * *